United States Patent [19]

Lyles

[11] Patent Number: 5,511,070
[45] Date of Patent: Apr. 23, 1996

[54] RESERVATION RING MECHANISM FOR CONTROLLING CONTENTION IN A BROADBAND ISDN FAST PACKET SWITCH SUITABLE FOR USE IN A LOCAL AREA NETWORK

[75] Inventor: Joseph B. Lyles, Mountain View, Calif.

[73] Assignee: Xerox Corporation, Stamford, Conn.

[21] Appl. No.: 365,998

[22] Filed: Dec. 29, 1994

Related U.S. Application Data

[63] Continuation of Ser. No. 131,839, Oct. 4, 1993, abandoned, which is a continuation-in-part of Ser. No. 887,164, May 20, 1992, abandoned.

[51] Int. Cl.$^6$ .................................................. H04L 12/56
[52] U.S. Cl. .............................................. 370/60; 370/58.1
[58] Field of Search .............................. 370/53, 54, 58.1, 370/60, 60.1, 94.1; 379/268, 271, 272

[56] References Cited

U.S. PATENT DOCUMENTS 4,761,780  8/1988  Bingham ...................................... 370/60
4,817,084  3/1989  Arthurs et al. ............................. 370/60
5,130,984  6/1992  Cisneros ................................. 370/94.1

*Primary Examiner*—Benedict V. Safourek

[57] ABSTRACT

A non-blocking, self-routing switch having a sorting network followed by a plurality of routing networks for routing packets from a plurality of inputs to a plurality of outputs includes a reservation ring mechanism for resolving conflicts among inputs contending for access to identical outputs. This reservation ring mechanism shifts a reservation vector in top-to-bottom ring-like order during at least one arbitration cycle for granting contending inputs access to identical outputs in top-to-bottom order, with a maximum permissible plural number of contenders being given access to such an output on each of said arbitration cycles whenever there still are at least said plural number of contenders in contention for that particular output. The reservation vector is composed of a plurality of bits for registering reservations for each of the outputs.

1 Claim, 13 Drawing Sheets

Arbitration Round 1

| | | | | |
|---|---|---|---|---|
| Input | 0 | Requesting | Output | 3 |
| Input | 1 | Requesting | Output | 3 |
| Input | 2 | Requesting | Output | 0 |
| Input | 3 | Requesting | Output | 3 |

*Fig. 9A*

Arbitration Round 2

| | | | | |
|---|---|---|---|---|
| Input | 0 | Requesting | Output | 3 |
| Input | 1 | Requesting | Output | 0 |
| Input | 2 | Requesting | Output | 0 |
| Input | 3 | Still Requesting | Output | 3 |

*Fig. 9D*

|  | Counter | IsetLost LastTime | resVec -Out | LostLast Time-In | LostThis Time-Out | Grant |
|---|---|---|---|---|---|---|
| Initialization | | | | | | |
| Port 0 | 0 | 0 | 00 | 0 | 0 | 0 |
| Port 1 | 0 | 0 | 00 | 0 | 0 | 0 |
| Port 2 | 0 | 0 | 00 | 0 | 0 | 0 |
| Port 3 | 0 | 0 | 00 | 0 | 0 | 0 |
| | | | | | | |
| Step 0 | | | | | | |
| Port 0 | 0 | 0 | 00 | 0 | 0 | 0 |
| Port 1 | 0 | 0 | 00 | 0 | 0 | 0 |
| Port 2 | 0 | 0 | 00 | 0 | 0 | 0 |
| Port 3 | 0 | 0 | 00 | 0 | 0 | 0 |
| | | | | | | |
| Step 1 | | | | | | |
| Port 0 | 1 | 0 | 00 | 0 | 0 | 0 |
| Port 1 | 0 | 0 | 00 | 0 | 0 | 0 |
| Port 2 | 0 | 0 | 00 | 0 | 0 | 0 |
| Port 3 | 0 | 0 | 00 | 0 | 0 | 0 |
| | | | | | | |
| Step 2 | | | | | | |
| Port 0 | 2 | 0 | 00 | 0 | 0 | 0 |
| Port 1 | 1 | 0 | 00 | 0 | 0 | 0 |
| Port 2 | 0 | 0 | 10 | 0 | 0 | 1 |
| Port 3 | 0 | 0 | 00 | 0 | 0 | 0 |
| | | | | | | |
| Step 3 | | | | | | |
| Port 0 | 3 | 0 | 10 | 0 | 0 | 1 |
| Port 1 | 2 | 0 | 00 | 0 | 0 | 0 |
| Port 2 | 1 | 0 | 00 | 0 | 0 | 1 |
| Port 3 | 0 | 0 | 10 | 0 | 0 | 0 |

*Fig. 9B*

|  | Counter | lsetLost LastTime | resVec -Out | LostLast Time-In | LostThis Time-Out | Grant |
|---|---|---|---|---|---|---|
| Step 4 | | | | | | |
| Port 0 | (4) | 0 | 00 | 0 | 0 | 1 |
| Port 1 | 3 | 0 | 11 | 0 | 0 | 1 |
| Port 2 | 2 | 0 | 00 | 0 | 0 | 1 |
| Port 3 | 1 | 0 | 00 | 0 | 0 | 0 |
| | | | | | | |
| Step 5 | | | | | | |
| Port 0 | (5) | 0 | 00 | 0 | 0 | 1 |
| Port 1 | (4) | 0 | 00 | 0 | 0 | 1 |
| Port 2 | 3 | 0 | 11 | 0 | 0 | 1 |
| Port 3 | 2 | 0 | 00 | 0 | 0 | 0 |
| | | | | | | |
| Step 6 | | | | | | |
| Port 0 | (6) | 0 | 00 | 0 | 0 | 1 |
| Port 1 | (5) | 0 | 00 | 0 | 0 | 1 |
| Port 2 | (4) | 0 | 00 | 0 | 0 | 1 |
| Port 3 | 3 | 1 | 11 | 0 | 1 | 0 |
| | | | | | | |
| Final Vectors | | | | | | |
| Output Port | 3 | | 11 | - | 1 | 1 |
| | 2 | | 00 | - | 0 | 1 |
| | 1 | | 00 | - | 0 | 1 |
| | 0 | | 11 | - | 0 | 0 |

*Fig. 9c*

|  | Counter | IsetLost LastTime | resVec -Out | LostLast Time-In | LostThis Time-Out | Grant |
|---|---|---|---|---|---|---|
| Initialization | | | | | | |
| Port 0 | 0 | 0 | 00 | 0 | 0 | 0 |
| Port 1 | 0 | 0 | 00 | 0 | 0 | 0 |
| Port 2 | 0 | 0 | 00 | 0 | 0 | 0 |
| Port 3 | 0 | 1 | 00 | 0 | 0 | 0 |
| | | | | | | |
| Step 0 | | | | | | |
| Port 0 | 0 | 0 | 00 | 0 | 0 | 0 |
| Port 1 | 0 | 0 | 00 | 0 | 0 | 0 |
| Port 2 | 0 | 0 | 00 | 0 | 0 | 0 |
| Port 3 | 0 | 1 | 00 | 0 | 0 | 0 |
| | | | | | | |
| Step 1 | | | | | | |
| Port 0 | 1 | 0 | 00 | 0 | 0 | 0 |
| Port 1 | 0 | 0 | 10 | 0 | 0 | 1 |
| Port 2 | 0 | 0 | 00 | 0 | 0 | 0 |
| Port 3 | 0 | 1 | 00 | 0 | 0 | 0 |
| | | | | | | |
| Step 2 | | | | | | |
| Port 0 | 2 | 0 | 00 | 0 | 0 | 0 |
| Port 1 | 1 | 0 | 00 | 0 | 0 | 1 |
| Port 2 | 0 | 0 | 11 | 0 | 0 | 1 |
| Port 3 | 0 | 1 | 00 | 0 | 0 | 0 |
| | | | | | | |
| Step 3 | | | | | | |
| Port 0 | 3 | 0 | 00 | 1 | 0 | 0 |
| Port 1 | 2 | 0 | 00 | 0 | 0 | 1 |
| Port 2 | 1 | 0 | 00 | 0 | 0 | 1 |
| Port 3 | 0 | 1 | 11 | 0 | 0 | 0 |

*Fig. 9E*

|  | Counter | lsetLost LastTime | resVec -Out | LostLast Time-In | LostThis Time-Out | Grant |
|---|---|---|---|---|---|---|
|  |  |  |  |  |  |  |
| Step 4 |  |  |  |  |  |  |
| Port 0 | (4) | 0 | 00 | 0 | 0 | 0 |
| Port 1 | 3 | 0 | 00 | 1 | 0 | 1 |
| Port 2 | 2 | 0 | 00 | 0 | 0 | 1 |
| Port 3 | 1 | 1 | 00 | 0 | 0 | 0 |
|  |  |  |  |  |  |  |
| Step 5 |  |  |  |  |  |  |
| Port 0 | (5) | 0 | 00 | 0 | 0 | 0 |
| Port 1 | (4) | 0 | 00 | 0 | 0 | 1 |
| Port 2 | 3 | 0 | 00 | 1 | 0 | 1 |
| Port 3 | 2 | 1 | 00 | 0 | 0 | 0 |
|  |  |  |  |  |  |  |
| Step 6 |  |  |  |  |  |  |
| Port 0 | (6) | 0 | 00 | 0 | 0 | 0 |
| Port 1 | (5) | 0 | 00 | 0 | 0 | 1 |
| Port 2 | (4) | 0 | 00 | 0 | 0 | 1 |
| Port 3 | 3 | 0 | 10 | 1 | 0 | 1 |
|  |  |  |  |  |  |  |
| Final Vectors |  |  |  |  |  |  |
| Output Port | 3 | - | 10 | - | 0 | 0 |
|  | 2 | - | 00 | - | 0 | 1 |
|  | 1 | - | 00 | - | 0 | 1 |
|  | 0 | - | 11 | - | 0 | 1 |

*Fig. 9F*

RESERVATION RING MECHANISM FOR CONTROLLING CONTENTION IN A BROADBAND ISDN FAST PACKET SWITCH SUITABLE FOR USE IN A LOCAL AREA NETWORK

CROSS REFERENCE

This is a continuation of application Ser. No. 08/131,839, filed Oct. 4, 1993, now abandoned, which is a continuation in part of application Ser. No. 07/887,164, filed May 20, 1992, now abandoned.

FIELD OF THE INVENTION

This invention relates to high speed, broadband communication networks and, more particularly, to high performance local area networks (LANs).

BACKGROUND OF THE INVENTION

Research projects and systems products soon will have bandwidth, responsiveness, and/or real-time requirements that exceed the capabilities of existing LANs. For example, the ongoing transition from paper to electronic formats for documents ranging from personal papers to technical libraries is leading to the development of advanced electronic scanning and printing devices, which have bandwidth requirements that will continue to increase, not only as the speed and resolution of these devices increase, but as the color and gray scale capabilities of these devices are extended. Another example of the demand for improved LANs centers on the high-quality video imagery that is envisioned by some of the emerging collaborative technologies, such as the Xerox Media Space, which utilize live video links and meeting-support systems that are based upon wall-sized display systems. Furthermore, high performance computers are becoming affordable for use as computing resources, high-performance file servers, visualization workstations, etc., but the LANs that are now in use do not have the capacity that is needed to support these higher performance computers.

The more demanding of the potential scientific computing and visualization applications require gigabit-per-second (Gbps) data transfer rates, but bandwidths in the 10–100 Mbps range are sufficient for the majority of the perceived applications. However, some of these applications, such as real-time video, will place a more continuous load on the network and require one-to-many ("multicasting") transmission in addition to point-point ("unicast") links. Therefore, a reasonable working assumption is that LANs soon will require aggregate bandwidths in the 10–40 Gbps range for supporting a more or less ordinary community of users simultaneously. Different user communities typically different needs, and the requirements of any given user community generally expand over time, so there is a need for a high performance LAN that scales gracefully and economically to satisfy the requirements of its user community.

Known FDDI (Fiber Distributed Data Interface) networks fail to meet either the peak or aggregate bandwidth requirements of the LAN that this invention envisions. Furthermore, many of the other recently developed technologies, such as those that are based upon crossbar switches or high-speed broadcast busses, appear to fall short of satisfying the multicast, broadcast and/or affordability requirements of the proposed LAN.

SUMMARY OF THE INVENTION

In accordance with this invention, a non-blocking, self-routing switch having a sorting network followed by a plurality of routing networks for routing packets from a plurality of inputs to a plurality of outputs includes a reservation ring mechanism for resolving conflicts among inputs contending for access to identical outputs. This reservation ring mechanism comprises means for shifting a reservation vector in top-to-bottom ring-like order during at least one arbitration cycle for granting contending inputs access to identical outputs in top-to-bottom order, with a maximum permissible plural number of contenders being given access to such an output on each of said arbitration cycles whenever there still are at least said plural number of contenders in contention for that particular output.

BRIEF DESCRIPTION OF THE DRAWINGS

Additional features and advantages of this invention will become apparent when the following detailed description is read in conjunction with the attached drawings, in which:

FIGS. 9A–9F, when read in order, illustrate the operation of the reservation ring shown in FIG. 8.

DETAILED DESCRIPTION OF THE ILLUSTRATED EMBODIMENT

Figure 1:
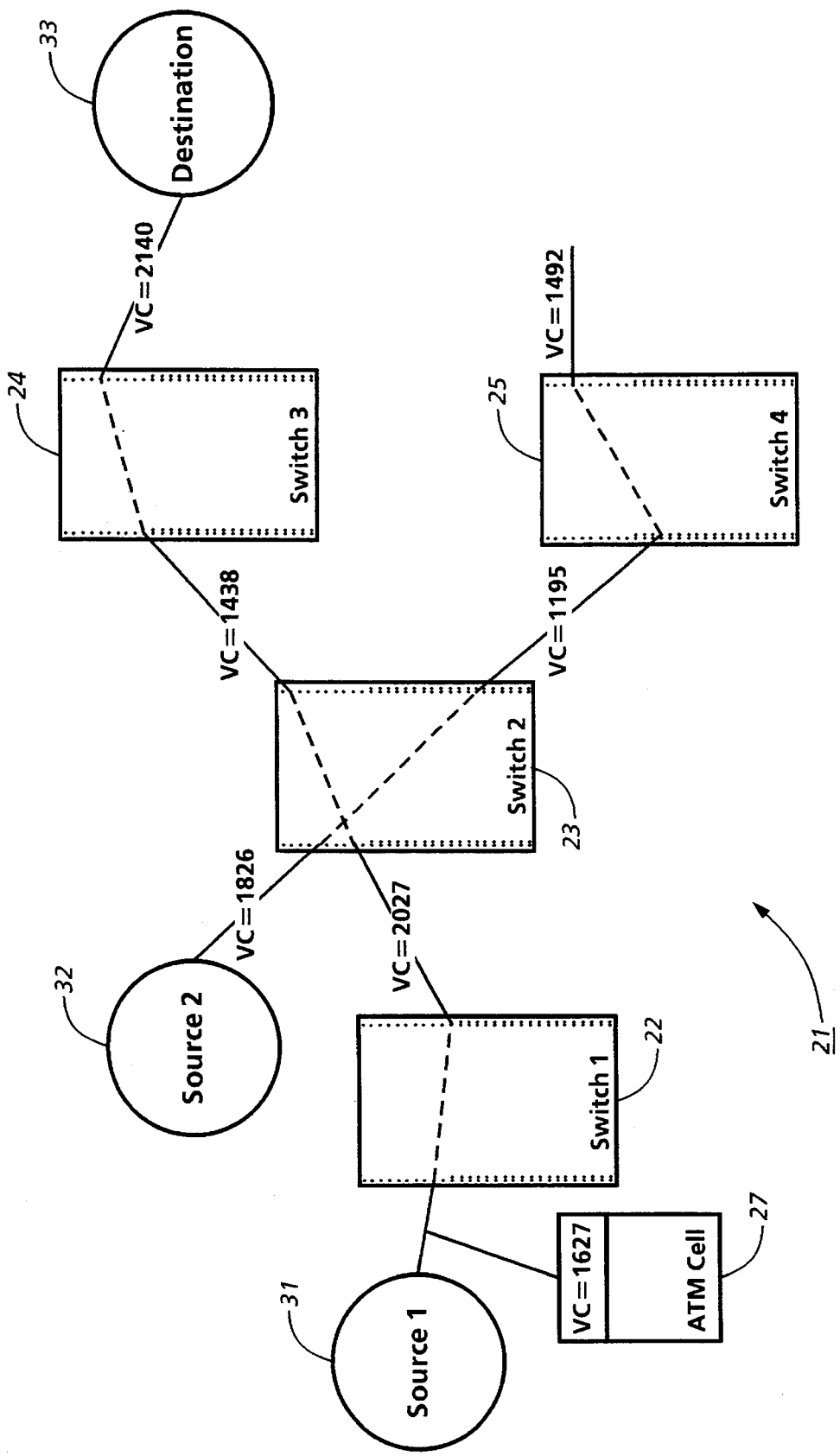
FIG. 1 schematically illustrates a hierarchical ATM LAN that is constructed in accordance with this invention.

While the invention is described in some detail hereinbelow with specific reference to an illustrated embodiment, it is to be understood that there is no intent to limit it to that embodiment. On the contrary, the aim is to cover all modifications. alternatives and equivalents falling within the spirit and scope of the invention as defined by the appended claims.

I. Definitions

As used herein, the following terms have the following meanings:

"Channel rate" is the bit rate of a particular stream, channel, etc.—for example, a single television transmission, a file transfer, a database transaction.

"Link rate" is the bit rate which a network device (host, router, switch) can or must sustain over an individual link pair of wires, coaxial cable, optical fiber). This rate is an upper bound on the channel rate. It also has a major influence on the cost of interface hardware and of network protocol hardware and software.

"Aggregate rate" is the maximum total network capacity, expressed as a sum of the link rates for the maximum number of links that may be transmitting simultaneously. For networks implemented as buses or rings or using single-frequency wireless broadcasting, the link rate is identical to the aggregate rate. Conversely, conventional telephone switching systems provide aggregate rates much higher than the rate of any link.

II. The Basic Architecture

The ATM LAN of the present invention can be implemented using a VLSI-based "Batcher/banyan" switching fabric of the type that has been developed by AT&T/Bellcore. As will be seen, this LAN supports unicast and multicast virtual circuits operating at link rates of 155 Mbps, with provision for increasing link speed to 600 Mbps. In the implementation that is disclosed herein, each switch will support 32 ports, but it is believed that the Batcher/banyan switching technology will scale to switches larger than 256 ports, and (in part because of the advances disclosed herein) link rates exceeding 1 gigabit/sec. Furthermore, these switches can be interconnected to form a larger, hierarchical network for supporting larger user communities.

One of the appeals of ATM switching is that it is well on its way to becoming a standard. The basic concept for this type of network is that all communications are accomplished by the transmission and switching of small, fixed-sized data packets, called "cells". The overhead of each packet is reduced by using virtual circuit techniques, whereby the header of each cell identifies a path that has been set up in advance through all the switches between the source and the destination, so that the information required to identify the cell and its desired routing is much smaller than the header information in a conventional XNS or TCP/IP datagram. Persons interested in the status of the ATM standards making activity and the technical content thereof should refer to papers published on that subject by Study Groups XI and XVIII of the CCITT (International Telegraph and Telephone Consultative Committee) and by ANSI (American National Standards Institute) sub-committee T1S1.

In accordance with the ATM standard that is being developed, a cell is a small, fixed-size (53-byte) packet whose header includes destination addressing information, which is known as the destination virtual circuit index, VCI. There also is a virtual path index (VPI), but switching on virtual paths is essentially identical to switching on virtual circuits so that subject need not be further discussed herein. Before a cell enters the switching fabric, the source host causes a fixed route, known as a "virtual circuit," to be determined for transferring the cell from its source to its destination. Each switched link in this virtual circuit (each switch-to-switch link and each switch to destination link) is uniquely identified by a switch specific virtual circuit identifier (VCI'). Thus, one virtual circuit has a number of names. Cells may not be reordered at any point along a virtual circuit, thereby they must arrive in the order that they were sent.

Referring to FIG. 1 with the foregoing in mind, it will be seen that there is a hierarchical LAN 21 that comprises a plurality of self-routing, non-blocking switches 22–25 for transferring cells, such as the ATM cell 27, from one or more sources 31 and 32 to one or more destinations 33. For example, in the case of a LAN, the sources 31 and 32 might be workstations, while the destination 33 might be a file server. As illustrated, the LAN 21 has two levels of hierarchy, but it will be evident that the hierarchy can be extended to provide packet transport and switching through much longer paths, including Metropolitan Area Networks MANs) and even Wide Area Networks (WAN's).

Figure 2:
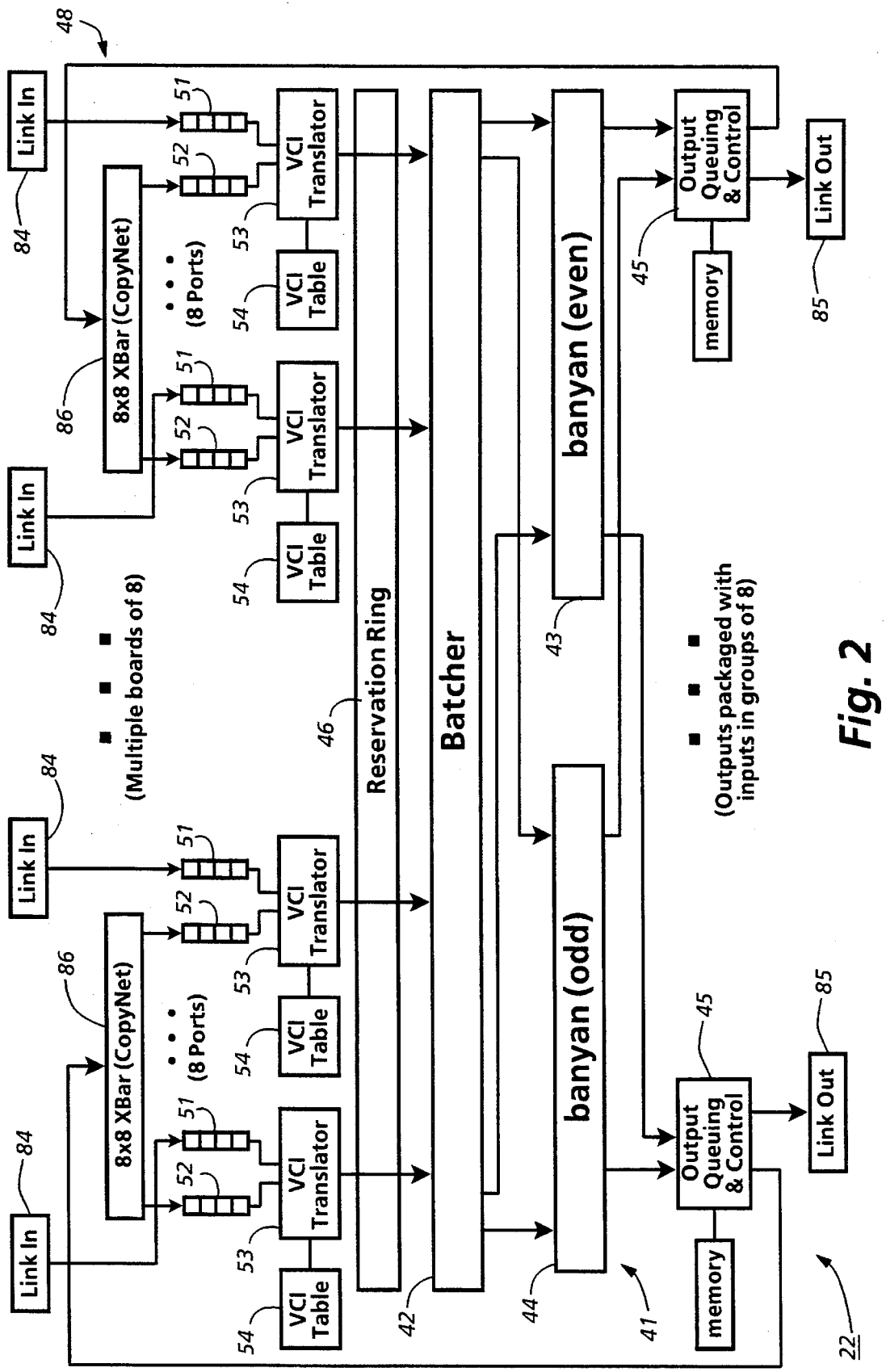
FIG. 2 schematically illustrates an ATM switch that is constructed in accordance with this invention.

Turning to FIG. 2, the switches 22–25 suitably are composed of respective Batcher/banyan networks 41. As illustrated for the switch 22, a single n port Batcher sorting network 42 feeds some number k typically two or three) banyan routing switches 43 and 44 that are connected such that as many as k cells can be routed to the same output port number during the same cell switching cycle without losing any of those cells. To accommodate this parallelism, there is a relatively large/several thousand cell) FIFO buffer 45 for each output port, which is constructed to receive up to k cells per cycle from the output banyans 43 and 44. To handle both real-time traffic and "best efforts" traffic, the FIFO 45 advantageously is composed of two FIFOs (not shown); a small FIFO of several hundred cells for rate-limited or reserved traffic, and a much larger FIFO for unreserved traffic. The size of the small FIFO is bounded by roughly twice the period of the rate-limited streams. For rates of interest this implies that the FIFO for reserved traffic should be at least 200 to 300 cells in size. For "bursty traffic" that is not bounded by strict rate limits, the associated virtual circuits are queued in the larger FIFO (best efforts traffic). It can be shown that TCP will run effectively if there is at least one full datagram's worth of buffering for each input port accessing a given output port. Thus for an N port switch where all N ports will be sending TCP packets to an output at once, approximately N times 4K bytes worth of buffering are needed in the larger output FIFO. As is known, FIFOs of these sizes easily are built from SRAMs.

As will be appreciated, if more than k cells were to be routed to the same output port number during a single switch cycle, the switch would fail to perform as expected, rather than simply dropping the excess cells. This situation must, therefore, be avoided. To that end, in keeping with accepted practices, a reservation ring 46 is provided for fairly adjudicating the contention among such conflicting cells, while permitting at most k of them to be presented to the switch in any cycle. As described in more detail hereinbelow, this reservation ring 46 is composed of a set of circuits, one for each port, that are wired through all the ports to form a systolic array.

Connected to the input side of the switching fabric 41 and the reservation ring 46 there is an n×n copy network 48, which can be constructed using either off-the-shelf or custom crossbar switch components. All cells are specifically marked as point-to-point or multicast cells by the state of a multicast bit in their switch headers. As will be seen, switch headers are prepended to the ATM cells for routing those cells through the switching fabric 41 and for entering them into the appropriate output queue at 45. Incoming multicast cells are routed around the copy network and through the switching fabric 41, but then are intercepted of the switching fabric and returned to the copy network 48, rather than being routed to outgoing lines.

More particularly, the destination virtual circuit index (VCI) in the header of a multicast cell identifies a group rather than an individual destination. Thus, the first pass of a multicast cell through the switching network 41 routes the cell to an input of the copy network 48 that is capable of producing C (or perhaps a few more) copies of the cell, where C is the size of the group to which the cell is addressed. Some additional complexity exists when it is necessary to deal with a hierarchical configuration of switches, such as in the case of the switches 22–25, but this complication does not contribute to hardware complexity. As the cell copies exit from the copy network 48 (but before they enter the switching network 41), preprogrammed per-port mapping hardware (not shown) addresses each copy to a different group member. To accomplish this, a separate table at each output port of the copy network typically is indexed by group number and contains the output port number for a respective member of the group, so any given input port of the copy network 48 can serve many groups of similar size. Clearly, the above-described copy network 48 is capable of supporting a large number of multicast groups, but it is best suited to applications where group membership changes occur relatively infrequently.

There also are FIFO cell buffers 51 and 52 for each of the input ports of the switch 41 for buffering incoming cells and cells supplied by the copy network 48, respectively. These buffers 51 and 52 hold the cells that have arrived at the input port until they can be routed through the switch 41 without contention (if desired, one or both of these buffers may be subdivided into sub-buffers to support multiple priority classes).

The routing of the cells through the switching network 41 is controlled by the VCI translators 53 at the input ports to the switch. These translators 53 use VCI table lookup memories 54, which are maintained and updated by a host processor (not shown), for computing a three-valued function of the input port address and the destination virtual circuit index (VCI) that is carried by the header of the cell at the head of the queue for the associated input port, i.e., [VCI', outputPORT, multicastFlag]←Routing Function [i, VCI]. As will be appreciated, interfaces to a conventional microprocessor or the like (not shown) are required to control the switch 22, primarily by loading the various routing and mapping tables into its VCI lookup tables 54.

III. A More Detailed Description of the Components of the Switch

A. The Virtual Circuit Translators

Figure 3A:
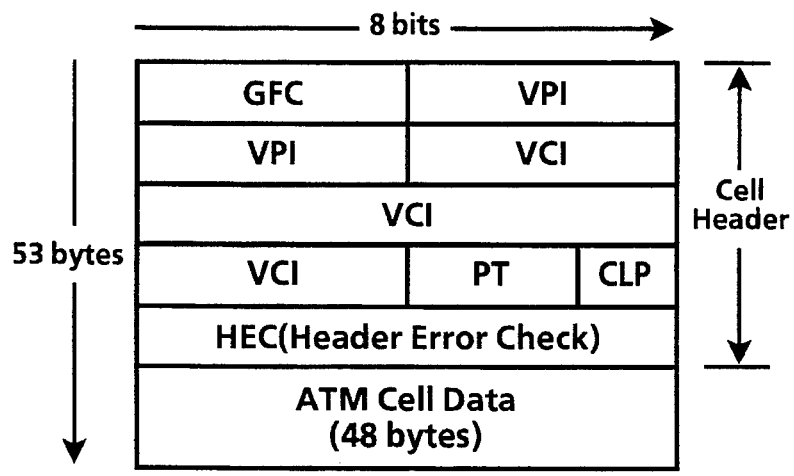
FIG. 3A illustrates the usual format of an ATM cell.
Figure 3B:
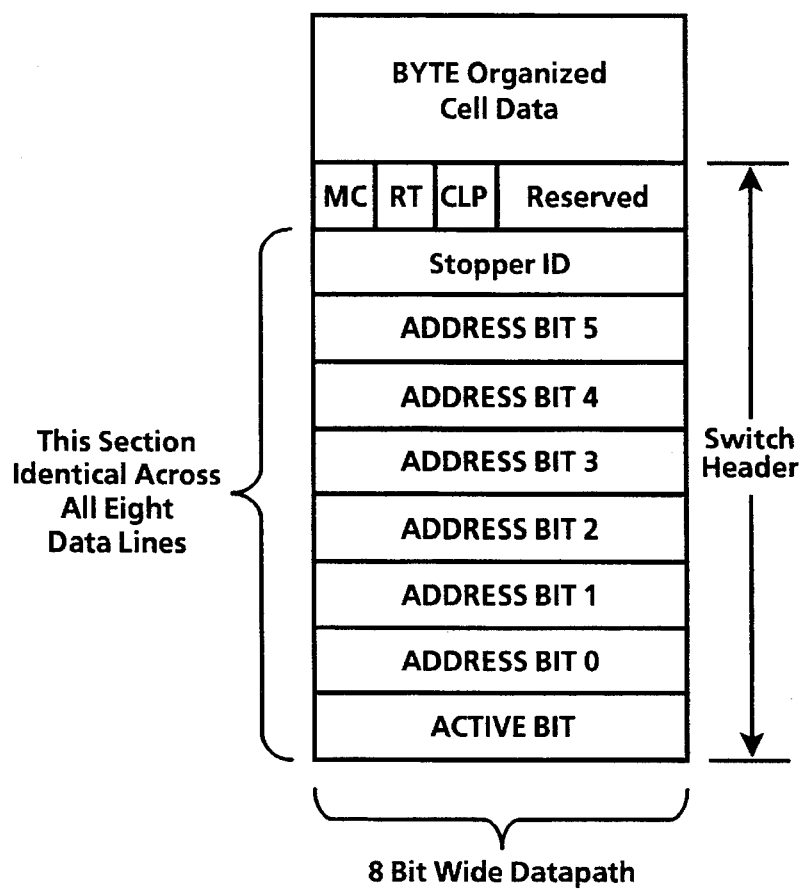
FIG. 3B illustrates a typical switch header for an ATM cell.

The translators 53 that are provided for performing the address-mapping at the input ports of the switching fabric 41 have several functions, including: selecting (based on the destination VCI/VPI address contained in the header of the ATM cell at the head of the input queue), the output port from the fabric 41 that is on the route to the desired destination; rewriting the incoming VCI/VPI address to the appropriate value for the outgoing link (as will be recalled, VCI/VPI's do not have end-to-end significance); and managing the specialized mapping that is required for multicast transmissions, as described in greater detail below. These translators 53 may also maintain a count of the number of ATM cells switched per virtual circuit, such as for billing and load monitoring purposes. FIG. 3A illustrates the format of a typical ATM cell, and FIG. 3B illustrates the format of a typical switch header for such a cell. It is to be noted that the global flow control (GFC) field in the cell header usually contains a NULL value.

B. The Batcher/banyan Network

A switching network is said to be "non-blocking" if, in any switching cycle, it is capable of generating an arbitrary permutation, or a partial permutation, of its inputs. In other words, a non-blocking switch is able to generate all possible one-to-one input/output mappings.

Switching networks typically are composed of cascaded networks of simple switches, or stages. A route through such a network is a path traversing switch stages from a given input to a given output. A switching network is classified as "self-routing" if, for each stage in the net, the routing can be determined with only the information contained in the cells entering that stage of the switch; that is, with locally available information.

Figure 4:
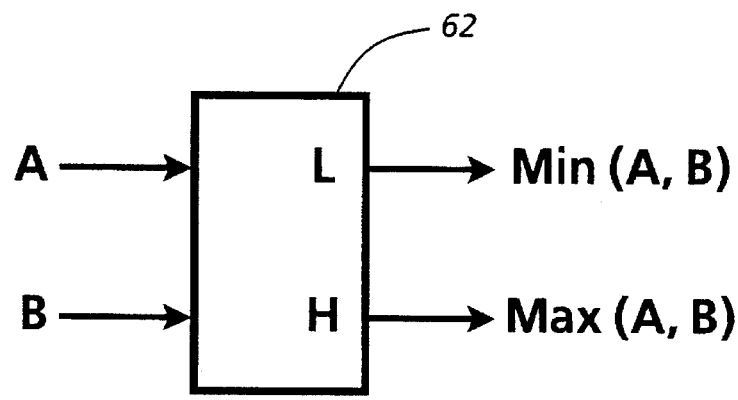
FIG. 4 schematically illustrates a Batcher sorting element.
Figure 5:
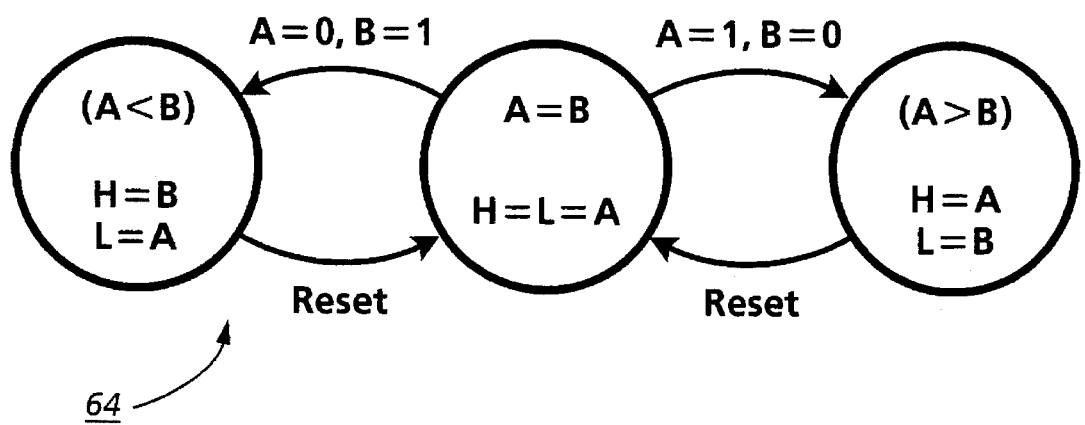
FIG. 5 is a finite state machine that illustrates the operation of a Batcher sorting element.
Figure 6:
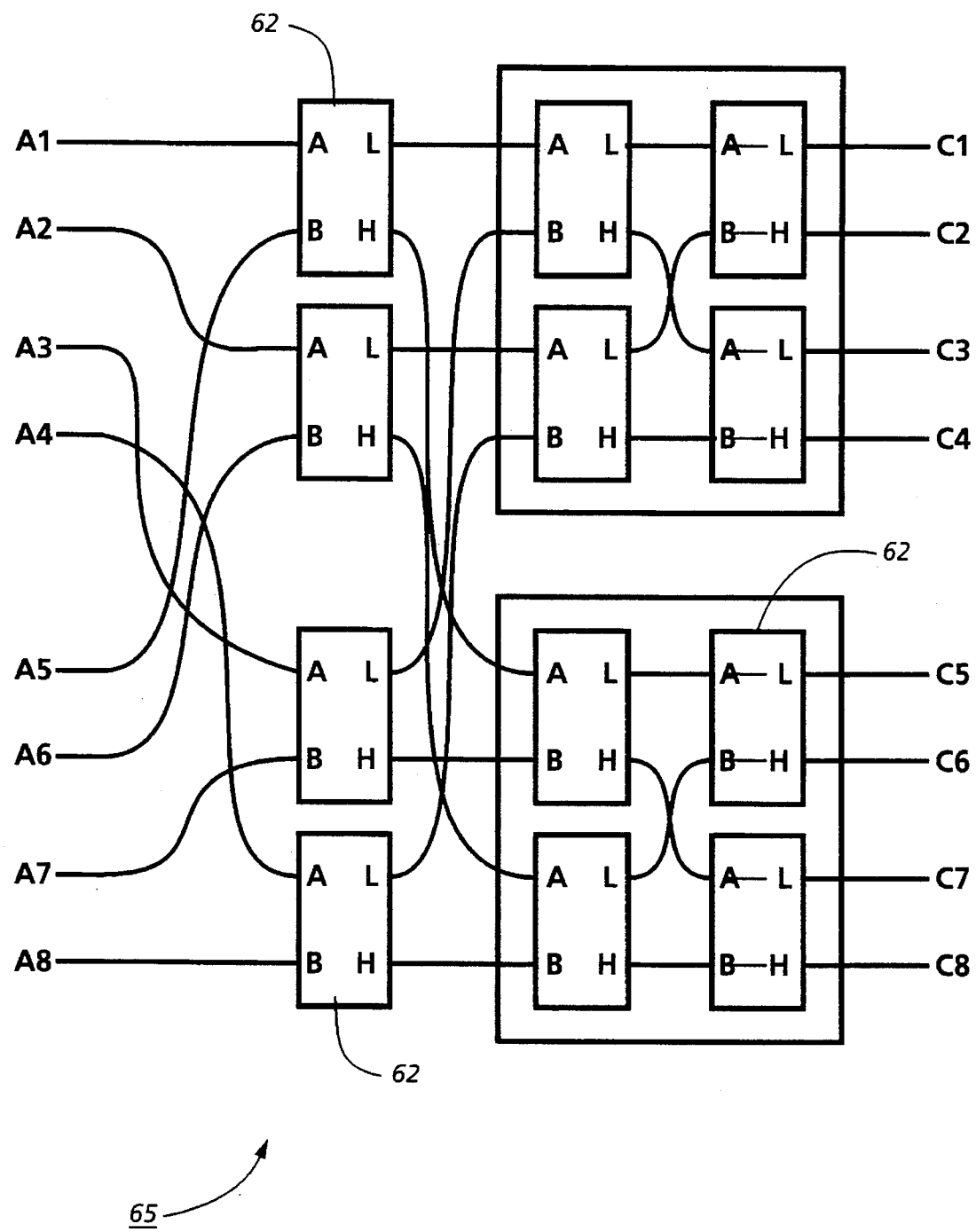
FIG. 6 schematically illustrates a Batcher sorting network that is composed of a recursive combination of sorting elements of the type shown in FIG. 4.

A Batcher/banyan network is a known example of a non-blocking, self-routing switching fabric. As is known, a Batcher network is a parallel sorting network that typically sorts N data streams with a network of depth $\log_2 N$, which means that $N\log_2 N$ sorting elements are required. As shown in FIG. 4, each sorting element 62 accepts two inputs "A" and "B" and computes both the minimum and the maximum thereof, thereby sorting the inputs. Thus, when the inputs are in the form of two bit serial data streams with the most significant bit first, then the sorting element functions as a very simple finite state machine, as at 64 in FIG. 5. These sorting elements 62 conventionally are recursively combined (see FIG. 6) to build sorters 65 for four, eight, and more inputs.

Figure 7:
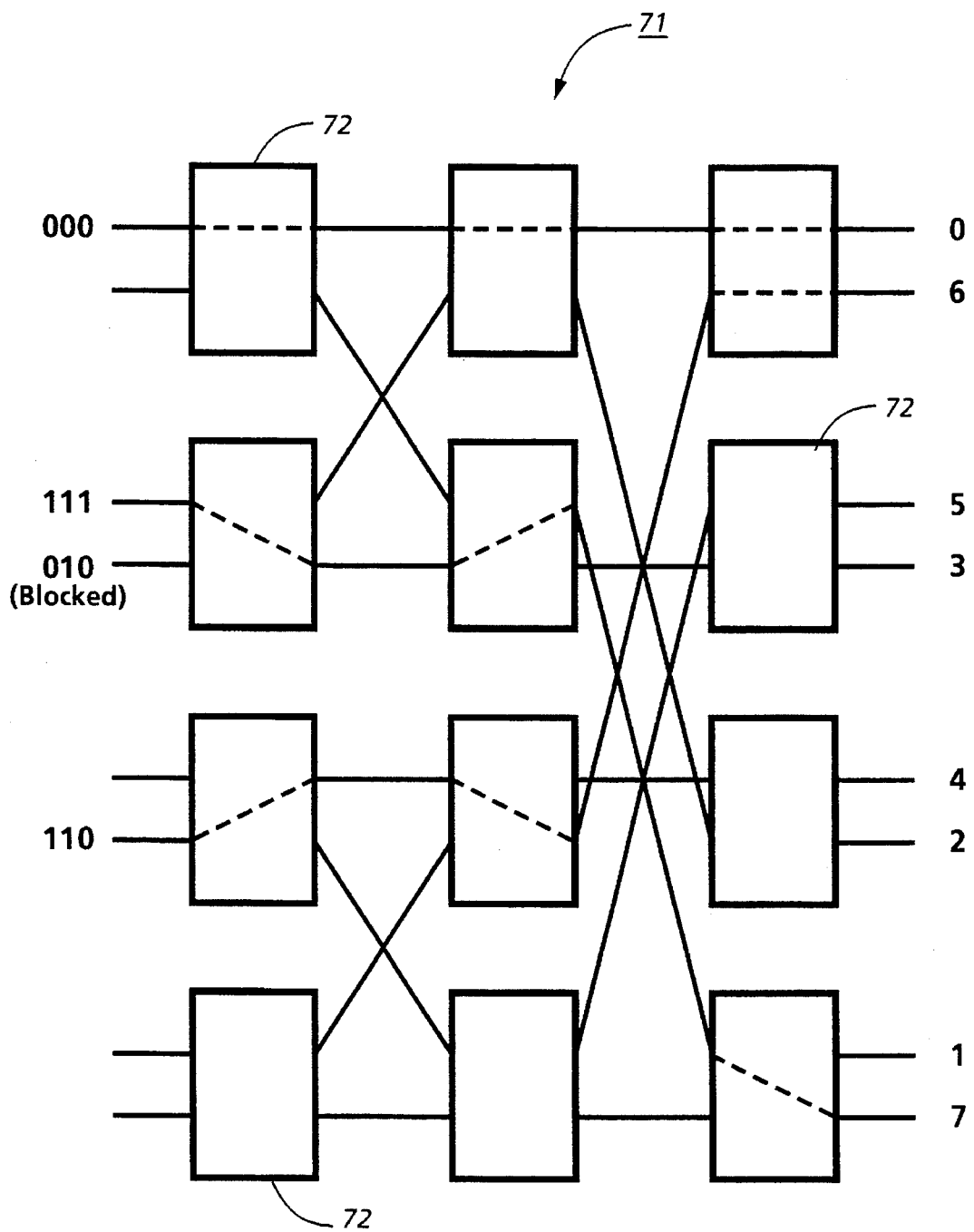
FIG. 7 schematically illustrates a banyan routing network.

As shown in FIG. 7, a standard banyan routing network 65 is a multi-stage network of depth $\log_2 N$, where N is the number of inputs to the network. As with the Batcher sorting network 65, the banyan routing network 71 is recursively composed of primitive switching elements 72; each of which has two inputs and two outputs. Thus there are O(NlogN) primitive switching elements 72 in the banyan network 71. When a data sequence streams through the banyan network 71, a primitive element 72 at each stage of the network 71 examines one bit of the output address and routes that bit and all subsequent bits in that particular sequence to one or the other of its outputs, depending on the value of the bit. In keeping with standard practices, the address bit changes for each stage, whereby the first stage routes based on the value of the highest order bit the second stage on the value of the second highest order address bit, and the Nth stage on the value of the lowest order bit. After N address bits have been processed, the remainder of the sequence follows the path that has been established to the switch output. This means that the end of one sequence and the beginning of the next must be determined by external factors. Thus, it should be recalled that in this instance each sequence is a fixed-size ATM cell plus its fixed size switch header.

At any stage of the banyan network 71, it is possible for both inputs to select the same output. If that occurs, the banyan network "blocks," so it produces indeterminate results. In other words, the banyan network 71 cannot compute an arbitrary permutation of its inputs, but there are classes of permutations for it is "non-blocking." One of these classes is the one in which the inputs are ordered by their output addresses. For that reason, as illustrated in FIG. 2, the Batcher sorting network 42 precedes the banyan routing networks 43 and 44, thereby providing a switching fabric 41 that is non-blocking and self-routing.

Advantageously, as shown in FIG. 2, multiple banyans 43 and 44 (typically, two or three) are used to reduce output contention. For example, in the illustrated embodiment, there are two banyan switching networks 43 and 44 following the Batcher sorting network 42 to provide a speed-up factor of k=2. Each of the banyans 43 and 44 uses only 1/k of its inputs, so the other inputs are tied off. The outputs of the Batcher 42, in turn, are connected to the inputs of banyans 43 and 44 so that every k-th output of the Batcher 42 is connected to the k-th input of the banyan 43 or the banyan 44 (as shown, this means that the banyans 43 and 44 route the odd and even numbered outputs of the Batcher 42, respectively). Consequently, up to k distinct cells addressed to the same output port can appear at k contiguous outputs of the Batcher 42 and then can be routed to the desired output port of the switching fabric 41 through k distinct banyans 43 and 44.

C. The Reservation Ring

The reservation ring 46 (FIG. 2) is the arbiter that implements "fair" access to the output ports of the switching fabric 41, when the number of cells destined for a single output exceeds "k". There are many different definitions of fairness but an arbiter that provides round-robin service for the competing input ports of the switching fabric 41 is favored.

An arbitration technique, to provide fair, round-robin contention resolution for switching fabrics, such as the fabric 41, having multiple routing networks 43 and 44 (i.e., networks where k≧2) is described in a copending and commonly assigned United States patent application of Lyles et al, which was filed Aug. 9, 1993 under Ser. No. 08/104,458 as a continuation in part of application Ser. No. 07/887,518, now abandoned. That application points out that the advantage of using a linear systolic array of evaluators to perform the arbitration function is that all communications are local (i.e., the only communication among the evaluators is between immediate neighbors in the "reservation ring", so electrical loads do not grow with array size.

D. An Alternative Arbitration Process

Figure 8:
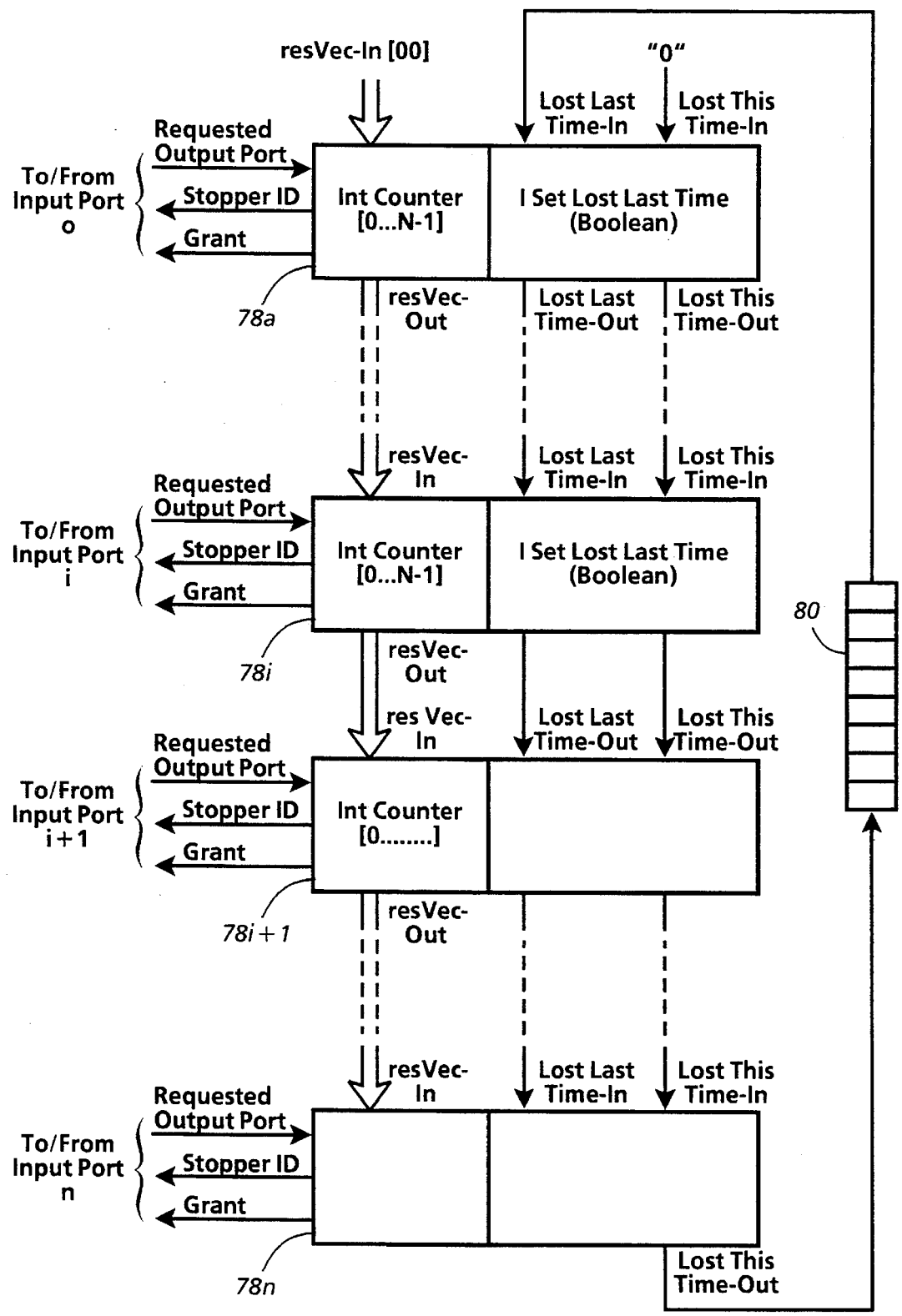
FIG. 8 schematically illustrates a reservation ring mechanism that is constructed in accordance with this invention.

In accordance with the present invention, there is another systolic array approach to providing "fair" access to the output ports of a banyan routing networks is schematically illustrated in FIG. 8. This technique builds on the teachings of Bingham et al. U.S. Pat. No. 4,761,780, "Enhanced Efficiency Batcher-banyan Packet Switch," which hereby is incorporated by reference.

As will be seen, Bingham et al. disclose a reservation ring for Batcher-banyan networks, but their reservation ring always gives priority to the first ("top") input port and is thus "unfair" in its implementation. More particularly, in accordance with Bingham et al's teachings, a bit vector is shifted through each of the reservation ring state machines/there is one such state machine per input port). Thus, the i-th bit in this bit vector denotes the reservation status of output port i. Therefore, if output port i has been reserved, then bit i has a true value (i.e., "1", otherwise it has a false value ("0". In order to determine the status of output port j, input port i must compare the numeric value j with a local (to input port i) counter which starts counting when the first bit of the bit vector reaches it. One way of visualizing this structure is to imagine a systolic array of state machines, one per input port, and a vector of reservation bits. The reservation vector starts off as all "0"/see FIG. 9B), then as it is shifted through the array of state machines 78a–78n it gets modified to indicate the reservation status of the output ports and the state machines get modified to contain the results of the reservation process. When the reservation factor is fully shifted out of the last or lowermost evaluation stage, all of the evaluators have a "go/no go" status for the next switch cycle (there is internal state in each evaluator/state machine such that one can generate a list of ports which will be active on this cycle, a list of ports which were inactive this time, and a list of ports which lost the arbitration this time). Moreover, the shifted out reservation vector (conceptually) indicates the output ports which will be accessed (this vector is conceptual since the reservation bits need not be saved).

This invention builds on the reservation ring algorithm disclosed in Bingham et al to provide fair (=round robin) access by all input ports on the switch to all output ports. It does so by making explicit the state vector of output ports for which some input port lost the arbitration, and by enhancing the internal state of each input port's evaluators/ state machine to include a bit indicating that this state machine was the first such machine tin order from the top of the ring) to set the "lost this time" bit. Thus, in keeping with this invention, there are three distinct bit vectors that are shifted through the array of evaluators/state machines 78a–78n: the reservation vector, a vector called "LostThisTime" where the i-th bit set to "1" to indicate that some input port has lost the arbitration on output port i during this arbitration cycle, and a vector "LostLastTime" where the i-th bit set to "1" to indicate that some input port lost the arbitration on output port i during the last arbitration cycle. LostLastTime is simply a copy of the previous arbitration cycle's LostThisTime vector. As will be understood, resVec-In, LostLastTime-In, and LostThisTime-In for any given evaluator stage, except the first or uppermost stage 78a in the ring ring, are identical to resVec-Out, LostLastTime-Out, and LostThisTime-Out, respectively, from the immediately preceding evaluator. The resVec-In and the LostThisTime-In values for the first stage 78a are forced to be false ("0", while the LostLastTime-In value for the first stage 78a is determined by the LostLastTime-Out value from the last or lowermost stage 78n in the reservation ring.

The reservation ring may be pipelined or non-pipelined to handle multiple reservation vectors simultaneously or to handle just one reservation vector at a time. For the non-pipelined case, theLostLastTime-Out value from the last evaluator 78n is routed to the LostThisTime-In port of the first evaluator 78a through a delay circuit 80 that provides a delay of n–1 clock cycles. In the pipelined case, the delay circuit 80 is omitted, but an additional signal is returned by means not shown) to each of the input ports to invalidate any grant that is returned to that port no more than n–1 clock cycles after the initial receipt of the grant (i.e., before the input port is permitted to participate in another arbitration session).

In summary, before an input port can win access, not only must the reservation vector entry for the requested output port be "0", but also there must not have been some other port which lost access to that output port during the last arbitration cycle; the presence of such a losing port being denoted by a "1" in the i-th position of the LostLastTime vector. If there are multiple state machines which lost during the previous arbitration cycle then the per state machine variable "ISetLostLastTime" is used to enable only the first of them; ISetLostLastTime being a negated copy of the i-th bit of the LostThisTime vector, e.g. it denotes whether some other state machine had already lost during this arbitration cycle.

More particularly, to carry out this invention for k=1, each of the evaluators 78a–78n functions as follows:

Initialize for arbitration:
   counter := 0;
   Grant := 0;
Arbitration step:
   lostLastTime-Out := lostLastTime-In;
   resVec-Out := resVec-In;
   lostThisTime-Out := lostThisTime-In;

-continued

```
IF counter = portRequested THEN {
  IF lostLastTime-In = 0 OR ISetLostLastTime THEN {
    IF res Vec-In = 0 THEN {
      Grant := 1;
      ISetLostLastTime := 0;
      resVec-Out := 1;
      lostThisTime-Out := 0;
      }ELSE{
        lostThisTime-Out := 1;
        ISetLostLastTime := NOT lostThisTime-In;
      };
  };
};
```

The stream of bits being shifted through the resVec inputs represent a vector, the elements of which are reservations of the corresponding output port. Operation of the ring is round-robin fair because if there is more than one requester for a given output port, then the first requester that fails to get access sets its associated "ISetLostLastTime" bit. At the end of the arbitration cycle there may be many reservation ring elements with the "ISetLostLastTime" bit set, but each of those bits then denotes a different output port.

As shown in FIG. 8, this reservation ring mechanism can be easily extended to handle the case where multiple input ports are given access to the same output port during a single cycle, such as through the use of a plurality (i.e., $k \geq 2$) of banyan routing networks 43 and 44 (FIG. 2). This is accomplished by making the reservation vector, resVec, k bits wide, where k is the number of input ports which can send to a single output port in one switching cycle. The reservation ring then operates as follows:

```
Initialize for arbitration:
  counter := 0;
  Grant := 0;
Arbitration step:
  lostLastTime-Out := lostLastTime-In;
  resVec-Out := resVec-In;
  lostThisTime-Out := lostThisTime-In;
  IF counter = portRequested THEN {
    IF lostLastTime-In = 0 OR IetLostLastTime THEN {
      IF resVec-In NEQ "all ones" THEN {
        Grant := 1;
        ISetLostLastTime := 0;
        StopperID =firstzero[resVec-In]
        resVec-Out[firstZero[resVec-In]] := 1;
        lostThisTime-Out := 0;
        }ELSE{
          lostThisTime-Out := 1;
          ISetLostLastTime := NOT lostThisTime-In;
        };
    };
  };
```

For convenience, some shorthand notation has been used in the above pseudo code. Thus, it is noted that "NEQ" means "not equal to, and" firstZero[resVecIn] refers to the least significant bit position that contains a false ("0" value in the reservation factor that is being inputted to the evaluator in question. Thus, if the resVec-In has true values (1's) in all of its k bit positions, there is "no firstZero[resVec-In]."

FIG. 9A–9F, when read in order, illustrate the step-by-step operation of the reservation ring shown in FIG. 8 for two arbitration rounds. The pending output port requests on each of the input ports for the first and second arbitration rounds are shown in FIGS. 9A and FIGS. 9D, respectively, and the resulting behavior of the reservation ring is shown in FIGS. 9B and 9C for the first arbitration round and in FIGS. 9E and 9F for the second round.

It may be desirable to divide larger reservation rings of the type shown in FIG. 8 into two (or more) sections. The reservation vector for both rings is still k bits wide. However, some of the k bits are initialized to "1" for the top section while the corresponding bits are initialized to "0" in the second section. The remaining bits are initialized to "0" in the top and "1" in the bottom. Assuming that the load is spread evenly over the inputs, the switch will function approximately as though there was only one reservation ring, but the two rings can run at half the clocking frequency of one single ring.

If traffic is not uniformly distributed across the two halves of such a subdivided reservation ring, bandwidth to any given output port can be transferred back and forth between the two rings by changing the initial setting of the bits for the reservation vector. Methods for calculating the traffic of each half of the ring include, but are not limited to:

1) Counting the number of "lostThisTime" bits set to "1" at the output of the lowermost or last evaluator in each half.

E. The Copy Network

The N×N copy network 48 of FIG. 2 accepts up to j ATM input cells, $I_{j,j \leq N}$, per switch cycle and makes $C_j$ exact copies of each of those cells. Each $C_j$ is called a copy group. As will be seen, the copying of a cell is a key step in what is known as a "multicast operation."

Three enforceable assumption about the usage of the switching fabric 41 underlie the illustrated approach to copy networks: the first is that for each j, $C_j$ changes very slowly; the second is that the sum of all copy group sizes is $\leq N$, and the third is that $C_j$ is a function only of j. Taken together, these conditions imply that the number of copies produced by each copy group changes very slowly which, in turn, means that the copy group membership is not a function of the cell contents. Accordingly, the particular value of for any copy group can be chosen via a static routing strategy, so one input and $C_j$ outputs of the copy network 48 are dedicated to each copy group.

In a standard crossbar switch, each of N inputs fans out to each of N outputs. This means that if the crosspoints connecting a single input to some subset of the outputs are turned "on", the input is copied to all those outputs. Conceptually the copy network 48 comprises an N×N crossbar with j inputs used as inputs to copy groups, N–j inputs unused, and $\Sigma C_j$ outputs used. As a practical matter, however, a full crossbar is not ordinarily needed. This is fortunate because large crossbars not only are expensive in terms of chips, but create difficult system packaging problems.

There are two approaches for constructing a simpler but adequate copy network 48. One of these builds the copy network 48 as two layers of N/m crossbars (not shown), where m is the size of a crossbar packaged on a single chip. At least one, and perhaps many, of the outputs of each of the crossbars in the first layer is connected to inputs on each crossbar chip in the second layer.

Such a copy network 48 is fully connected, but is not non-blocking. This is satisfactory if the following condition holds: if g is the average size of a copy group, there must be at least m/g connections between each crossbar in the first layer of the copy net and any crossbar in the second layer. For small systems this should not pose a problem since crossbars are available commercially in sizes up to 64×64. This implementation of the copy network 48 is workable but is at somewhat of a disadvantage for larger switching fabrics because of its inherent packaging problems. For example, if data paths wider than one bit are used to reduce clock rates, the necessary number of pins at the backplane will tend to be large. On the other hand, if the data paths are narrow, then either substantial care must be taken with the clock distribution or the input/output lines must have embedded clocks.

Fortunately, as shown in FIG. 2, an alternative is available for applications in which the most common use of the copy network 48 is for small copy groups, where the switching fabric 41 itself can be used to interconnect a plurality of "virtual circuit layers" within the copy network 48 when a multi-node spanning tree is needed to produce the requisite number of cell copies $C_j$ for a copy group. This favored embodiment of the copy network 48 is consistent with using the natural system packaging because it can be implemented using two types of boards; the switching fabric 41 and N/p identical line cards, each with the complete logic for p lines. As shown in FIG. 2, the line card logic includes (for its p lines) the input and output links 84 and 85, respectively, the VCI translation circuits 53, the reservation ring evaluators (see FIG. 8), all of input and output buffering, and a p×p crossbar 86. When such a multicast network 48 is employed, a multicast to groups larger than p (where, say, p=8) or a broadcast is handled by multicasting to multicast groups, so the cells make three trips through the switching fabric 41.

F. Input and Output Buffering-Queuing Strategy

The switching fabric 41 uses distributed queuing—i.e. one or more dedicated queues for each input and output line—rather than shared queuing. As is known, shared queuing is useful for dynamic reallocation of buffer space across all lines: an approach which tends to use buffer memory more efficiently. In this case, however, design simplicity is more important than optimizing the buffer utilization, so provision is made for isolating the input and output lines from each other, while imposing a fair service discipline on the switch. Consequently, if several inputs transmit to any single output at a rate that substantially exceeds the ability of the output to carry the traffic, cells will be lost by the switch at either the buffers for those input lines or at the buffer for that particular output.

The LAN 21 (FIG. 1) suitably employs a straightforward flow control mechanism for limiting guaranteed traffic load. Specifically, the network interface hardware/software (not shown) of the workstations and other computers, such as the sources 31 and 32, that are serviced by the LAN are relied on to limit the rate of guaranteed traffic. In keeping with standard practices, a resTraf bit in the VCI table (which is copied to the switch header) is used to denote guaranteed traffic streams that have made resource reservations in advance. Thus, for each input port of each of the switches 22–25 there are at least two input queues, one for the guaranteed traffic and the other for non-guaranteed traffic. Non-guaranteed cells are not enqueued if the non-guaranteed queue is full.

IV. System Operation

A. Unicast

A unicast transmission is the ordinary routing of a cell from its source to a specified single destination, as defined by a predetermined virtual circuit address (VCI). At any given switch, such as the switch 22 in FIG. 2, a unicast operation begins with the arrival of a cell at the input link 84 for one of the input ports of the switching fabric 41. Logic (not shown) within the input link checks the VCI field in the cell header to confirm that it contains a non-zero value (i.e., to confirm that the cell is not empty). If the cell passes this test, the state of the input buffer 51 for the given input port is checked to determine whether it can accept the cell or not. Preferably, the state of the cell loss priority (CLP) bit in the header of the cell is taken into account in making this accept/reject decision, such that the cell is shifted into the input buffer 51 only (1) if the buffer 51 is not full and the CLP bit is reset, or (2) if the buffer 51 is less than, say, half full.

The virtual circuit translator 53 at each input port of the switching fabric 41 removes cells from both the input buffer 51 and from the XBar buffer 52, with priority being given to the XBar buffer 52. As we will see, the translator 53 is active only if there is not already a cell blocked at the reservation ring 46 due to output contention. In the absence of such a blocking condition, the two input FIFO's 51 and 52 are examined at the start of each switching cycle, and a cell is taken from either the XBar buffer 52 (first choice) or the input buffer 51 (second choice). If both of these FIFO's 51 and 52 are empty, a NULL or empty cell of all zeros is generated.

At the virtual circuit translator 53, the first four bytes of the header of the chosen cell are shifted into a four byte+ten bit delay buffer (not shown) and the rest of the cell—e.g., 49 bytes of information in the case of a standard ATM cell—is shifted into an VCI translation FIFO (also not shown). The VCI value contained within this header then is used to index into the VCI translation table 54, thereby acquiring the information for generating a switch header (see FIG. 3B). This switch header, in turn, is written into the first ten bits of the delay buffer. The VCI translation table 53 also supplies a new VPI/VCI value for the cell, which is used to overwrite the old VPI/VCI value Thereafter, the check sum in the ATM cell's header, i.e., the "HEC" field (see FIG. 3A), is updated.

The switch header suitably is formatted to contain: an active flag (1 bit) that indicates whether the cell is empty or not; an output port address (6 bits for the 64 ports that are provided by two parallel 32 port banyans); a stopper bit (1 bit for the dual banyan switching fabric 41, the source and function of which are described in more detail hereinbelow). Furthermore, the switch header typically contains a multicast flag (1 bit) to indicate whether the output port is to transfer the cell to the copy network 48, a reserved traffic (RT) bit (1 bit) to distinguish between reserved and unreserved traffic on the net, a cell loss priority (CLP) flag (1 bit) to indicate whether the cell is or is not a favored candidate to be dropped in the event of an overload (this bit is a copy of the CLP bit in the ATM header) and reserved bits (5 bits) to pad the switch header so that it is two bytes long).

In practice, the Batcher/banyan switching fabric 41 (FIG. 2) advantageously is configured in accordance with known techniques to provide byte wide (8 bit wide) data paths between its input and output ports. The first byte of the switch header (i.e., the active bit, the output port address, and the stopper bit) is transmitted over such a data path in a bit parallel mode, but the remaining byte of the switch header and all 53 bytes of the ATM cell preferably are transferred in a byte parallel mode to take advantage of the parallel data path structure of the switching fabric 41.

Cells that have been processed by the virtual circuit translators 53 come under the arbitration control of the reservation ring 46. To carry out its arbitration function, the reservation ring 46 examines only the headers of the cells that are at the head of the input queues for the switching fabric 41 to determine whether there any contention conflicts among those cells and, if so, to resolve those conflicts. In practice, the VCI translation buffer (not shown) is of bounded depth.

Whenever the evaluator (see FIG. 8) for a given input port of the switching fabric 41 (FIG. 2) wins an arbitration round, the cell pending at that input is then routed through the switching fabric 41. As illustrated, the baseline switch design comprises two banyan networks 43 and 44 (k=2), each of which ultimately connects to the buffer 45 for the selected output port. If a cell is not active (i.e., if the active bit in the switch header that is prepended thereto= 0) then the cell will not be queued by the output buffer 45. On the other hand, if the cell is active and if the resTraf bit in its switch header is turned "on," then the cell will be enqueued in a section of the output buffer 45 that is reserved for guaranteed traffic. Or, if the cell is active and if its resTraf bit is "off," the cell then is put in a section of the output buffer 45 that is reserved for non-guaranteed/i.e., unreserved) traffic.

Cells in the guaranteed queue of any given output buffer 45 are always dequeued before any of the cells in the non-guaranteed queue. When a cell is being unicast, the multicast bit in its switch header is turned "off" (i.e., "0", so when a unicast cell is dequeued, the cell is marked to be routed to the associated output link 45.

As will be recalled, the first byte of the switch header is duplicated across all eight bits (i.e., across all of the parallel data paths), while the second byte is transmitted byte parallel, so the switch header adds nine bytes to the cell length. Furthermore, at the output link, two additional bytes of framing information are added to the 53 byte long cell t by conventional means not shown), so the byte rate at the output buffer 85 is at least (53+9)/(53+2) times greater than the byte rate of the output link to which it is connected. To accommodate this disparity, a short FIFO (not shown) typically is provided for speed matching each output buffer 45 to its associated output link 85.

B. Multicast

As previously pointed out, a multicast group is a virtual circuit addressing a plurality of network destinations. Thus, each stage of the switch must know the switch output ports that will have to be accessed to forward copies of the input cell to all destinations in the group. From the point of view of a single switch, such as the switch 22 (FIG. 1), a multicast group is a VCI/VPI pair specifying a cell that is to be routed to a known set of destination VCI's. One of the features of the switch of this invention is the routing of a multicast input cell is carried out in two stages, whereby the correct number of copies are first produced by routing the multicast cell through the correct input copy network 48, and those copies of the multicast cell are then individually rerouted through the switching fabric 41 to the intended destinations.

Multicast operations begin with the same steps as unicast operations. The first difference occurs during the VCI translation process because the indexed entry VCI translation table 54 (FIG. 2) specifies whether the VCI in the header of the input cell denotes a unicast address or a multicast group address. Thus, for a cell having a multicast VCI, the multicast bit in the switch header is set. Such a cell then transits the switching fabric 41 to the output queue 45 that the switching fabric 41 associates with the named multicast VCI. On exit from that queue, the state of the multicast bit instructs the hardware to route the cell back to the copy network 48 via the copy net input that is coupled to the given output buffer 45, rather than to the associated output link 85. The copy network 48, in turn, makes some number of identical copies, say j copies, of the cell. These j copies, in turn, are individually routed to the j outputs of the copy network 48 that are dedicated to the given copy group, and each of those outputs then feeds the copy that it receives into the XBar or copy net FIFO 52 for an input port of the switching fabric 41. The active bit in the header of each copy distinguishes active cells from empty ones, thereby enabling the FIFO's 52 to enqueue active cells while discarding empty ones.

After being queued in the set of copy net FIFOs 52 that are associated with the given copy group, the cells are removed by the virtual circuit translators 53 in regular order, as previously described. Since each virtual circuit translator 53 has a distinct VCI translation table 54, the j copies of the cell receive j different VCI translations. Thus, for each of the j cells, the subsequent processing steps are identical to a unicast cell or to the first pass of a multicast cell through the fabric 41.

As will be appreciated, the routing of a multicast cell through the switching fabric 41 of any one of the switches depends on the rewrites of the VCI that occur in the virtual circuit translators 53. For example, let j be the size of a multicast group, and let vci, vci'i and vci"i be the VCI values that successive instances of a multicast cell takes on during the multicast operation, 0<i<j. When the cell first enters the switch 22 (FIG. 2) its VCI value is vci. Thus, during the cell's first pass through one of the virtual circuit translators 53, the switch header for the cell gets generated based on the value vci, thereby causing the VCI value in the cell header to be rewritten to vci'. As a result, upon exiting the copy network 48 there are j exact copies of the cell, each with a VCI value of vci'. Each of these copies then is translated at a respective one of the translators 53, using j different VCI translation tables 54, each of which contains a different translation for its respective vci'-th entry. Accordingly, the i-th copy of the j cells emerging from the copy network 48 receives a unique switch header and a unique VCI value of vci"i.

In some instances, it may be desirable to package the copy network 48 on a single board or card (not shown), thereby reducing the complexity of the switch. This is a viable option, even if copy groups larger than the line card size are permitted, because the switch can be used to interconnect successive layers of the copy network 48. Operationally this is done by permitting multilevel multicast groups. In other words, the VCI's of the j copies emerging from the copy network 48 can be translated at the translators 53 into VCI's for further multicast groups, and the multicast flag bit in the switch headers for those copies can be set, thereby causing the switch to reroute the copies back through the copy network 48. If this option is utilized, the i-th cell from the above example either will be processed through the rest of the switch as a unicast cell or will again be handled as a multicast cell, depending on whether the multicast bit in the switch header for that cell is set to zero or not. If the copy that emerges from the copy network 48 is another multicast cell, VCI values of vci''', vci''' and vci'''' will be generated for the header of that cell as it makes another pass through the switching fabric 41.

In short, one the more notable features of the copy network 48 is the ease with which it can be programmed to accommodate copy groups of various sizes. This programming is built into the VCI translation tables 54, so changes to the copy group memberships should be minimized because such a change requires reconstruction of one or more of the translation tables 54.

C. Retention of Packet Integrity-Stopper ID's

Known Batcher/banyan chips have one bit wide data paths and typically run at clock rates of about 155 MHz. Thus, they are well matched to the low end of the rates specified for ATM networks because the lowest of the specified ATM rates is approximately 155 Mbits/sec. However, less aggressive clock rates can be used, without compromising the bit throughput capacity of the switch, because plural batcher/Banyan networks can be run in parallel with each other. For example, it is known that eight bit-serial Batcher/banyan networks can be run in parallel at a clock rate of approximately 20 MHz to provide a throughput capacity of about 155 Mbits/sec.

As will be recalled, an additional speed-up factor of k can be obtained by constructing the switching fabric 41 (FIG. 2), so that it has a Batcher sorting network 42 followed by k banyan switching networks 43 and 44. In that event, up to k cells can be simultaneously routed to the same output port of the switching fabric 41.

To successfully combine the speed-up factor that is provided by the parallel banyans 71a and 71b with the parallelism that is afforded by running multiple bit-serial Batcher/banyan networks in parallel with each other, care must be taken to prevent the contents of cells that are addressed to the same output port from being intermingled. As previously pointed out, to run multiple Batcher/banyan networks in parallel with each other, the output port address must be transmitted on each bit of the multi-bit data paths. The Batcher sorting network 42 conventionally sorts its inputs based on the addresses of the output ports to which those inputs are addressed. If, however, multiple cells have identical output addresses, then this sort is based on the bit or bits immediately following the address. Thus, if the address bits are followed by essentially random data, there is the risk that the contents of cells that are addressed to the sane output port will be intermingled with each other.

To overcome this problem, a "stopper ID," which can take on up to k unique values, is appended to the output port address in the switch header for each input cell before the cell is routed through the switching fabric 41. This ID is transmitted on all bits of the data path as an appendage to the output port address, thereby ensuring that all bits of the data path sort the same.

As will be appreciated, there can be at most k cells routed to any given output port address per switch cycle, so the stopper ID suitably is a integer that takes on k unique values. Indeed, it is most convenient to have the stopper ID range between 0 and k−1 because that guarantees a deterministic sort order for all the bits of any set of k cells. Advantageously, the stopper ID is computed by the reservation ring 46. In the first of the above-described embodiments of the reservation ring 46, the stopper ID suitably is the value that is returned by the mod k counter at the time of grant. In the second or alternative embodiment of the reservation ring 46, the stopper ID suitably is the value that is returned by "firstZero[resVec-In]".

D. Trunk Grouping

The data rates that currently appear to be of most interest for Broadband ISDN communications are based on the Optical Carrier (OC) hierarchy. The lowest data rate defined for Asynchronous Transfer Mode is approximately 155 Mb/sec, or OC-3. Higher data rates also are defined (for example, OC-12 at approximately 622 Mb/sec). These higher speed links are appropriate for inter-switch trunks or for connections to high-capacity servers, such as a shared file server (not shown). However, it may be prove to be technically and/or economically difficult to build a switching fabric that will run at the higher speeds.

A method well known in the telecommunications industry is to service a single higher speed line with a multiplicity of input/output ports on the switch. The chief technical difficulty associated with this so called "trunk grouping" is the requirement that cell order within any given virtual circuit must be maintained.

Figure 10:
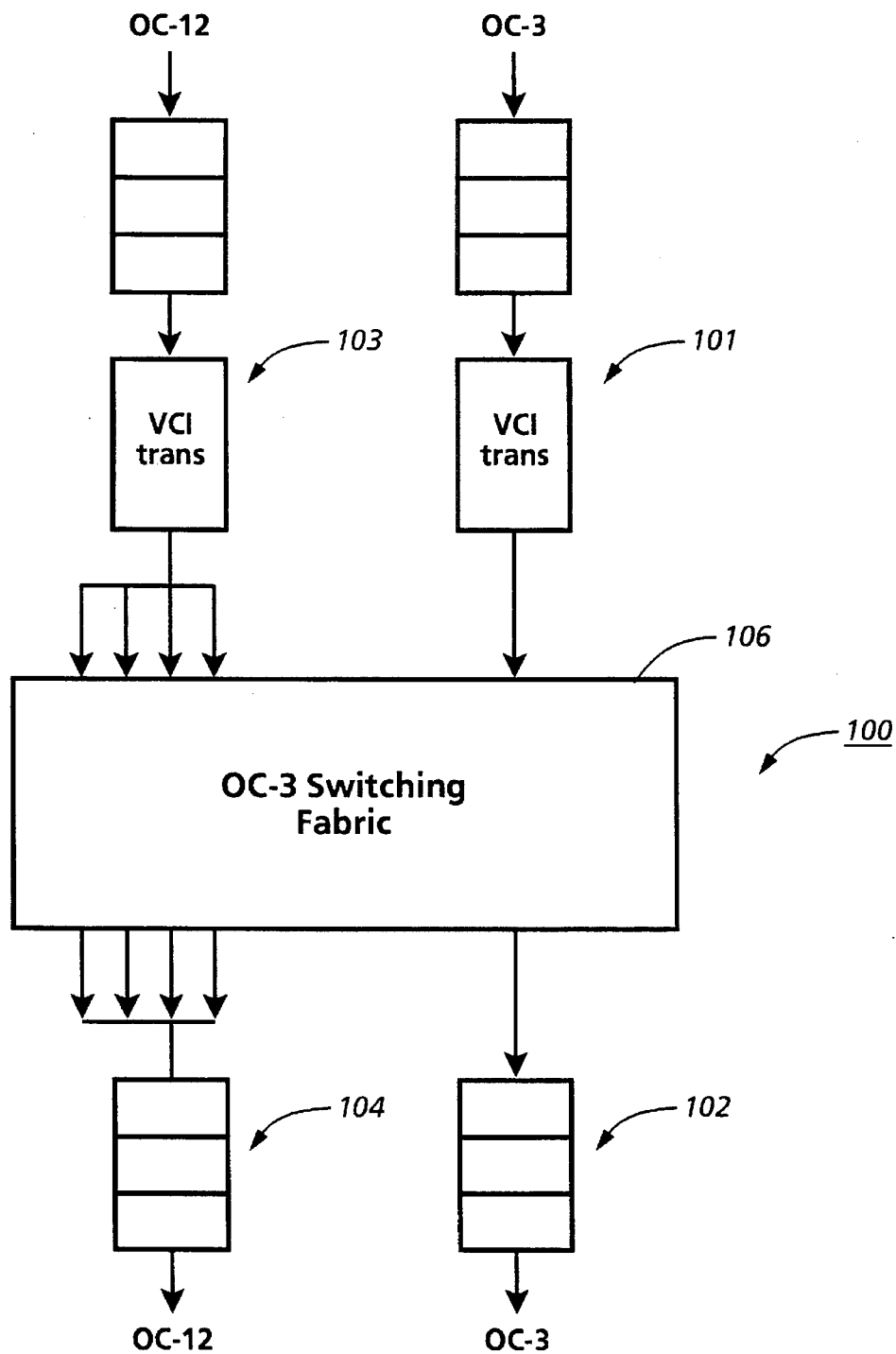
FIG. 10 schematically illustrates a switch that has trunk grouped inputs and outputs.

Referring to FIG. 10 with the foregoing in mind, there is a switch 100 with two input lines and two output lines. One of the input lines 101 and one of the output lines 102 run at essentially the same speed as the switch (as described hereinabove). While the other input line 103 and the other output line 104 are "trunk grouped" to run at four times the switch speed. For convenience, these will be refer to as OC-3 and OC-12 lines, respectively, although it will be apparent that different line rates and switch speeds could be utilized.

Focusing first on the trunk grouped output line 104, it will be apparent that 4 OC-3 lines must be aggregated to drive an OC-12 output line. If, as before, the switching fabric 106 has k banyan networks, then up to 4*k cells can be loaded into the output buffer 107 for the trunk group output lines 104 during any single cell time (however, only up to 4 of these cells can be removed from the buffer 107 for transmission over such an OC-12 output line during a single cell time).

As will be recalled, the first of the above-described reservation ring mechanisms (see FIG. 8) resolves the contention among cells that are competing for access to the same output port of the fabric by performing a series of at least n−1 shift and compare steps for comparing the output ports that are requested by the cells at the heads of the input queues (the $RA_i$'s) against a circulating reservation vector (the $SA_i$'s). However, in the case of a trunked grouped output line, this comparison is performed with the lower order $\log_2$ A bits of the requested address IRA) and the circulating reservation factor (SA) masked, where A is the number of input ports that are aggregated to drive a trunked group output. For example, if four OC-3 inputs are aggregated to drive an OC-12 output, the two lower order bits of the RA and SA values are masked.

The determination as to whether a given input cell is destined to a trunked group outlet or not suitably is determined by using the N/A higher order bits of the output port address in the switch header for the cell to index into a table of N/A entries, each of which is a boolean that indicates whether the requested output is a trunk group or not. In other words, in the case of the foregoing example, this means that the trunk grouped/not trunk grouped determination would be made by using the four higher order bits of the output port address to index into a table of 16 entries.

If it is found that the requested output port is a trunk group, the physical address for that port can be computed by overwriting the lower order $\log_2$ A bits of the port address in the switch header with the higher order $\log_2$ A bits from a $\log_2$ A+$\log_2$ k mod A+k counter, thereby discriminating among the input lines for a trunked grouped output. Returning again to the above example, this means that the lengths of the counters in the evaluators 76a–76n of the reservation ring shown in FIG. 8 are extended by two bits, so that the two higher order bits can be used to overwrite the two lower order bits in the switch headers of the cells that are destined to trunk grouped OC-12 output ports.

While the cell order must be maintained within any given virtual circuit, it need not be preserved among different virtual circuits. If cells are being fed to a trunk grouped output, such as an OC-12 output, by a plurality of non-trunk grouped inputs, such as a plurality of OC-3 inputs, each of the inputs can feed no more than one cell to the trunk grouped output during any given cell time. Therefore, since the above-described stopper ID's effectively maintain order among the groups of up to A*k cells that can arrive at a trunked group output at distinct cell times, none of the k streams of cells will have any of its cells disordered.

Preserving cell order is a somewhat more complex problem when there is a trunk grouped input, such as the OC-12 input 103 in FIG. 10, that can feed cells either to non-trunk grouped outputs (e.g., OC-3 outputs) or to trunk grouped outputs (e.g., OC-12 outputs). Cell order must be maintained within any given virtual circuit, even though multiple cells from such a virtual circuit may arrive at a trunk grouped output during a single cell time. However, a solution to this problem is at hand because the lower order $\log_2 A$ bits (e.g., the two lower order bits in keeping with the above example) of the physical port address for a trunked group output and the $\log_2 k$ bit long stopper ID that is appended to that address are computed by the reservation ring 46 (as modified to include the aforementioned $\log_2 A + \log_2 k$ long counters) and they, therefore, provide a secondary sort key for trunk grouped traffic. Therefore, whenever two or more cells with the same virtual circuit are transmitted to the same output port of the switching fabric 100, the cells are ordered in accordance with this secondary sort key.

This secondary sort would be a full and complete solution to the ordering problem if cells were mapped onto the inputs of the switching fabric 106 in strictly increasing order (as will be recalled, the reservation ring 46 grants contending inputs access to the desired output port in round-robin, top-to-bottom order). Such a strict order is not, however, maintained since the arbitration process wraps in a ring-like manner from the lowest numbered contending input port to the highest numbered contending input port whenever there still are one or more unsent cells for the same [output port, VCI] combination in the queue for the reservation ring 46.

One possible solution to this ordering problem is to enforce the notion of arbitration sessions as described by algorithm 1 of the above-identified Cisneros paper, such that a cell that arrives at the head of the input queue after the start of an arbitration session for cells that are destined to the same [output port, VCI] combination must wait until the end of that arbitration session to be enqueued at the reservation ring 46. That can be effectively accomplished by preventing a cell at the head of the queue for a given input of the switching fabric 106 from being enqueued by the reservation ring 46 whenever there still is a cell at a higher numbered input that is destined to the same [output port, VCI] combination if that cell is not yet participating in an arbitration session (i.e., $FC_j=0$ in the evaluator for that higher numbered input port). The head of queue blocking that is inherent to this approach may tend to reduce the throughput of the switching fabric 106 slightly, but such blocking can be minimized by shunting blocked cells into small FIFO's (not shown) that return them to the head of the queue only after they are no longer blocked.

Still another solution to the cell ordering problem is to utilize a priority function, such as described in algorithm 2 of the above-identified Cisneros paper. To use this approach, a $\log_2 A/e$.g., two bit long for the above example) priority field is assigned to each of the input ports of the switching fabric 100, so that each of these fields can be initialized to a value that equals the number of cells at the reservation ring 46 that match the [output port, VCI] destination of the cell at the head of the input queue for the port to which the particular priority fields is assigned. Then, after each complete cycle through the reservation ring 46, the priority field for each input port can be decremented by one for each cell transmitted to that particular [output port, VCI destination] during that cycle. This provides a different concept of "fair access" than the above-described solution to the ordering problem because it forces the arbitration to be strictly round-robin across the input lines, rather than round-robin across the inputs to the switching fabric, but that is acceptable.

Conclusion

In view of the foregoing, it will be understood that the reservation ring mechanism of this invention effectively resolves output contention in self-routing non-blocking switches having plural routing networks, with minimal impact on the switch throughput.

What is claimed:

1. In a switch having a sorting network followed by a plurality of routing networks for routing packets from a plurality of input ports which are coupled to said sorting network to a plurality of output ports which are coupled to said routing network, a reservation ring mechanism coupled to said input ports for resolving conflicts among input ports when said input ports are contending for access to identical output ports, said reservation ring mechanism comprising means for shifting a reservation vector across said input ports in top-to-bottom ring-like order during at least one arbitration cycle for granting contending input ports access as needed to identical output ports in top-to-bottom order, with a maximum permissible plural number of input ports being given access to any given output port on each of said arbitration cycles whenever there still are at least said plural number of input ports in contention for said output port, said reservation vector having a plurality of bits for registering reservations for each of said output ports.

* * * * *